United States Patent Office 3,201,347
Patented Aug. 17, 1965

3,201,347
ION-INCORPORATION OF POLAR SOLIDS AS LUBRICATION STABILIZER
John J. Chessick, Bethlehem, Pa., and John B. Christian, Dayton, Ohio, assignors to the United States of America as represented by the Secretary of the Air Force
No Drawing. Filed Oct. 30, 1962, Ser. No. 235,174
3 Claims. (Cl. 252—25)

The invention described herein may be manufactured and used by or for the United States Government for governmental purposes without the payment to us of any royalty thereon.

The invention that is described herein is a composition of matter and a method or a process for making the composition of matter as a polar solid for its addition to lubricants for the stabilization thereof at temperatures up to 650° F. or 343° C. and in the presence of moisture.

Lubricants have been stabilized for temperatures up to about 233° C. or 450° F., previously in conformity with the teachings in the literature and in the U.S. Letters Patents numbered 2,890,171 to Armstrong; 2,583,604-6 issued to Sirianni; 2,898,305; 2,900,349 to Schwartz; 2,897,136; 2,870,154; 2,819,230, etc. The lubricants in these patents are oils, grease and the like.

Terms that are used herein are defined in dictionaries of the English language; The Encyclopedia of Chemistry (Supplement) by Clark and Lawley, published in 1958 by Reinhold Publishing Corporation, New York, N.Y.; Physical Chemistry by Daniels and Alberty, published in 1961 by John Wiley and Sons, Inc., New York, N.Y., and the like.

Silica, silicon compounds, attapulgite, resins, phenol plastics, silicones, etc., and soaps have been mixed with lubricants in the past as stabilizers thereof at elevated temperatures, pressures and bearing speeds.

Surface energy in ergs is surface tension in dynes, since it may be transformed into work at constant temperature and pressure, according to Daniels and Alberty in their discussion of surface chemistry.

The present invention provides solids of colloidal size with surfaces that have surface free energies that are believed to approach optimum values for the intended purpose. The solids here involved are stable under the service they perform.

The object of the invention is the provision of at least a monolayer of a material having an advantageously low surface free energy on stable particles of colloidal size that on its addition to a lubricant imparts stability to the lubricant up to a temperature of about 650° F. or 343° C. for extended periods of operation.

Simple binary compounds that form cations and anions that are suitable in the practice of the present invention illustratively are colloidal particles of silica, amorphous carbon, ferrous oxide, and the like, bearing surface coatings or a monolayer of, for example, mercuric iodide, lead iodide, lead oxide, lead nitrate, serium nitrate, thorium nitrate, silver chromate or zinc chloride.

Ions in the outermost layer of the stabilized lubricant adjust best to the imbalance of forces at the surface by changing positions in their electron cloud distribution. Lead nitrate deposited on the surface of silica reduces to lead oxide at elevated temperatures.

Ion incorporation of mercuric iodide into colloidal silica possibly as a very thin amalgam if at all, is illustrative of the process that is described herein. Three satisfactory methods for making the product here of interest were developed.

First method

In the first method particles of silica are heated to within a temperature range of from 275° C. to 300° C. within a closed furnace, and mercuric iodide in its vapor state is passed over the hot silica as it is being tumbled, for the condensation of the mercuric iodide on the surface of the silica particles that illustratively are of colloidal size. The process is continued until a monolayer of mercuric iodide coats each colloidal particle of silica, such illustratively as for a two hour period of time. The charge is then cooled either in the furnace or in the air as preferred. The product analyses by weight about 80% $SiO_2$ and 20% $HgI_2$.

Silica melts at 1710° C. Mercuric iodide melts at 259° C. and boils at 354° C.

Since the silica particles are maintained at a temperature below the condensation temperature of the mercuric iodide, the mercuric iodide passes from its vapor state to its liquid state on the surface of the silica crystals. Silica gel with many pores and large surface areas is very effective in the adsorption of gases.

Flocculation is minimized by the tumbling of the colloidal silica during the application to its surface of a monolayer of mercuric iodide. The free surface energy at the solid-liquid interface is the driving force for flocculation where multimolecular adsorption of vehicle molecules occurs.

Second method

The composition of matter that is contemplated hereby is prepared by mixing the charge togetther intimately in a non-reactive container in the proportion by weight of 10 grams of $SiO_2$ particles with 2.5 grams of $HgI_2$. The charge is mixed under laboratory conditions of temperature of 22° C. and at a pressure of one atmosphere. The nonreactive container illustratively is a fused quartz tube or the like. The quartz particles preferably are of colloidal size within the range of from $10^{-7}$ to $10^{-5}$ cm. diameter. Mercuric iodide is in its liquid state between the temperatures of from 259° C. to 354° C.

The quartz tube containing its charge is placed within a furnace with its controls set to remain within the range of from 275° C. and 300° C. and the quartz tube is rotated within the furnace for about a two hour time period. The charge is cooled and again is found to have the composition by weight of near 80% $SiO_2$ and 20% $HgI_2$.

Third method

The charge is prepared by intimately mixing together under laboratory conditions of temperature and pressure, by weight in the proportion of 10 grams of $SiO_2$ with 2.0 grams of $HgI_2$ and transferring the mixture to a crucible.

The crucible with its charge is placed inside a closed muffle furnace that is maintained within the temperature range of 750° C. to 850° C. The temperature of the muffle furnace is increased to and is held for one hour at 850° C. during which the crucible contents are mixed, as by being tumbled, rotated or the like, within the furnace, during which time a monolayer of $HgI_2$ is applied to the particles of $SiO_2$. The product is then cooled within the furnace until its temperature is well below the boiling point of its components and then it is ready for use.

Use

The colloidal $SiO_2$ with its monolayer of $HgI_2$ is added to a lubricant such as paraffin oil by weighing out the materials in the proportion illustratively of 5 g. of the colloidal $SiO_2$ coated with $HgI_2$ and 45 g. of paraffin oil for a mix that consists by weight illustratively of 78.3% paraffin oil, 17.4% $SiO_2$ and 4.3% $HgI_2$.

The mix is worked to a uniform consistency on a suitable device, such as by being fed from above onto a feed end roll of a three-roll horizontal mill with a drip pan beneath the rolls.

The uniformly milled mix is removed from the mill discharge end roll remote from the mill feed end roll or charge end, by a knife blade that is spring-loaded to yieldingly hold the knife edge against the rotating cylindrical surface of the mill end discharge roll. The uniformly milled mix is fed into cans or jars as a lubricant ready for storage and for use. The lubricant so produced contains no soap.

On the basis of color change, treating agents become increasingly darker in color in the group order of: $Th(NO_3)_4$, $Ag_2CrO_4 > ZnCl_2$, $Ce(NO_3)_3 > PbI_2$, with thorium nitrate much darker than lead iodide.

The method that is disclosed herein is applicable to provide lubrication thickness that is more stable at higher temperatures than is that accomplished by the addition to oil of untreated colloidal silca. Silica is combined successfully with lead oxide, lead iodide, lead nitrate, thorium nitrate, zinc chloride, silver chromate and cerium nitrate, to improve the lubrication characteristics of the product. The products that are preferred for their stability in the presence of water are colloidal silica coated with silver chromate or with zinc chloride.

The silica in the present invention may, if preferred, be replaced by amorphous carbon or by ferrous oxide.

It will be apparent that the process steps and the product that are disclosed herein are submitted as being illustrative of the invention that is disclosed herein and that similarly functioning materials and methods may be used as modifications thereof without departing from the scope of the present invention.

We claim:

1. The composition of matter that consists of a lubricant containing, in oil stablizing amounts under operating conditions in the order of 650° F., a major portion of colloidal silica particles in the solid state, and a minor amount of mercuric iodide in a substantially monolayer on the surface of the silica particles.

2. The composition of matter that consists of a lubricant containing in stabilizing amounts at 650° F. colloidal particles in the solid state and in major amounts and selected from the group that consists of silica, amorphous carbon, and iron oxide, and in a minor amount a substantially monolayer coating on the surface of the colloidal particles and which coating is selected from the group that consists of lead iodide, lead oxide, lead nitrate, mercuric iodide, thorium nitrate, zinc chloride, silver chromate and cerium nitrate.

3. The composition of matter that consists of a lubricant containing in stabilizing amounts under operating conditions in the order of 650° F. silica particles of colloidal size, with a thin substantially monolayer coating of mercuric iodide on the surface of the particles of silica, and the colloidal silica particles with coated with the mercuric iodide consisting of by weight about 80% silica and 20% mercuric iodide.

References Cited by the Examiner

UNITED STATES PATENTS

| | | | |
|---|---|---|---|
| 1,999,573 | 4/35 | Odell | 117—100 |
| 2,253,955 | 8/41 | Hebbe et al. | 117—100 |
| 2,671,758 | 3/54 | Vinograd et al. | 252—397 |
| 2,890,257 | 6/59 | Ayers et al. | 252—397 |
| 2,948,679 | 8/60 | Rees et al. | 252—29 |
| 3,007,878 | 11/61 | Alexander et al. | 252—313 |
| 3,050,408 | 8/62 | Orsino et al. | 106—308 |
| 3,085,905 | 4/63 | Prevot et al. | 117—100 |

DANIEL E. WYMAN, *Primary Examiner.*